(12) United States Patent
Zweigenbaum et al.

(10) Patent No.: US 7,855,356 B2
(45) Date of Patent: Dec. 21, 2010

(54) DETERMINATION OF CHEMICAL EMPIRICAL FORMULAS OF UNKNOWN COMPOUNDS USING ACCURATE ION MASS MEASUREMENT OF ALL ISOTOPES

(75) Inventors: Jerry A. Zweigenbaum, Middletown, DE (US); Earl M. Thurman, Almerta (ES); Imma Ferrer, Almerla (ES)

(73) Assignee: Agilent Technologies, Inc., Santa Clara, CA (US)

( * ) Notice: Subject to any disclaimer, the term of this patent is extended or adjusted under 35 U.S.C. 154(b) by 216 days.

(21) Appl. No.: 12/324,351

(22) Filed: Nov. 26, 2008

(65) Prior Publication Data

US 2009/0078863 A1     Mar. 26, 2009

Related U.S. Application Data

(62) Division of application No. 11/267,721, filed on Nov. 4, 2005, now Pat. No. 7,462,818.

(51) Int. Cl.
*G01N 33/48* (2006.01)
(52) U.S. Cl. .......................... 250/281; 250/282; 702/19; 702/23
(58) Field of Classification Search ....................... None
See application file for complete search history.

(56) References Cited

U.S. PATENT DOCUMENTS

7,349,809 B2   3/2008   Goodenowe

*Primary Examiner*—David A Vanore (57) ABSTRACT

A method of determining an empirical formula of an analyte ion from a measured mass spectrum including a main peak and one or more isotope peaks. The method comprises comparing a relative isotopic intensity of the measured isotope peak to a calculated relative isotopic intensity of an isotopic ion of a proposed empirical formula and comparing a relative mass defect of the measured isotope peak to a calculated relative mass defect of the isotopic ion of the proposed empirical formula. The proposed empirical formula is identified as a potential candidate for the analyte ion based on these comparisons.

11 Claims, 9 Drawing Sheets

TABLE 1

| | Isotope | Relative Atomic Mass | Isotopic Composition | | Isotope | Relative Atomic Mass | Isotopic Composition |
|---|---|---|---|---|---|---|---|
| Positive defect | $^1H$ | 1.0078250321(4) | 99.9885(7) | | $^{31}P$ | 30.97376151(20) | 100 |
| | $^2H$ | 2.0141017780(4) | 0.0115(7) | | | | |
| | $^{12}C$ | 12.0000000 | 98.93(8) | | $^{32}S$ | 31.97207069(12) | 94.93(31) |
| | $^{13}C$ | 13.0033548378(10) | 1.07(8) | | $^{33}S$ | 32.97145850(12) | 0.76(2) |
| | | | | | $^{34}S$ | 33.96786683(11) | 4.29(28) |
| | | | | | $^{36}S$ | 35.96708088(25) | 0.02(1) |
| | $^{14}N$ | 14.0030740052(9) | 99.632(7) | | $^{35}Cl$ | 34.96885271(4) | 75.78(4) |
| | $^{15}N$ | 15.0001088984(9) | 0.368(7) | | $^{37}Cl$ | 36.96590260(5) | 24.22(4) |
| | $^{16}O$ | 15.9949146221(15) | 99.757(16) | | $^{39}K$ | 38.9637069(3) | 93.2581(44) |
| | $^{17}O$ | 16.99913150(22) | 0.038(1) | | $^{40}K$ | 39.96399867(29) | 0.0117(1) |
| | $^{18}O$ | 17.9991604(9) | 0.205(14) | | $^{41}K$ | 40.96182597(28) | 6.7302(44) |
| Negative defect | $^{19}F$ | 18.99840320(7) | 100 | | $^{79}Br$ | 78.9183376(20) | 50.69(7) |
| | | | | | $^{81}Br$ | 80.916291(3) | 49.31(7) |
| | $^{23}Na$ | 22.98976967(23) | 100 | | $^{127}I$ | 126.904468(4) | 100 |
| | $^{28}Si$ | 27.9769265327(20) | 92.2297(7) | | | | |
| | $^{29}Si$ | 28.97649472(3) | 4.6832(5) | | | | |
| | $^{30}Si$ | 29.97377022(5) | 3.0872(5) | | | | |

TABLE 2

| Element | Accurate Mass | Accurate Mass Difference A+1 | Relative Mass Defect A+1 | Accurate Mass Difference A+2 | Relative Mass Defect A+2 | Percent Abundance % |
|---|---|---|---|---|---|---|
| Hydrogen 1 | 1.007825 | | | | | 99.9885 |
| Hydrogen 2 | 2.014102 | 1.006277 | 0.0063 | | | 0.0116 |
| Carbon 12 | 12.000000 | | | | | 98.93 |
| Carbon 13 | 13.003355 | 1.003355 | 0.0034 | | | 1.078 |
| Nitrogen 14 | 14.003074 | | | | | 99.632 |
| Nitrogen 15 | 15.000109 | 0.997035 | -0.0030 | | | 0.368 |
| Oxygen 16 | 15.994915 | | | | | 99.757 |
| Oxygen 17 | 16.999100 | 1.004185 | 0.0042 | | | 0.038 |
| Oxygen 18 | 17.999160 | | | 2.0042 | 0.0042 | 0.205 |
| Sulfur 32 | 31.972071 | | | | | 94.93 |
| Sulfur 33 | 32.971459 | 0.999387 | -0.0006 | | | 0.76 |
| Sulfur 34 | 33.967867 | | | 1.9958 | -0.0042 | 4.29 |
| Chlorine 35 | 34.968853 | | | | | 75.78 |
| Chlorine 37 | 36.965903 | | | 1.9970 | -0.0030 | 24.22 |
| Bromine 79 | 78.918338 | | | | | 50.69 |
| Bromine 81 | 80.916291 | | | 1.9980 | -0.0020 | 49.31 |

TABLE 3

Compound

| | | |
|---|---|---|
| Carbon | 9 | 108 |
| Hydrogen | 16 | 16.12520051 |
| Oxygen | 0 | 0 |
| Nitrogen | 5 | 70.01537003 |
| Sulfur | 0 | 0 |
| Chlorine | 1 | 34.96885271 |
| Bromine | 0 | 0 |
| Phosphorus | 0 | 0 |
| Deuterium | 0 | 0 |
| Fluorine | 0 | 0 |
| Sodium | 0 | 0 |
| Iodine | 0 | 0 |
| Potassium | 0 | 0 |
| electron | 0 | 0 |

Propazine

| | | |
|---|---|---|
| Sum % (A+1) | | 12.06 |
| +1 isotope | | 0.0024 |
| Sum % (A+2) | | 32.43 |
| +2 isotope | | 0.0029 |

Input parameters

Target m/z: 388.1413 ▼ amu
Tolerance: 30 ppm ▼
Result type: Elemental ▼
Max num of results: 200
Min DBE: -0.5   Max DBE: 50
Electron state: Even ▼
Num of charges: +1 ▼

Set elements and limits

[ Calculate ]  [ Show isotopic ]  [ Export to file ]  [ Help ]

| # | Formula... | Calculated m/z (amu) | mDa Error | ppm Error | DBE |
|---|---|---|---|---|---|
| 1 | C12 H27 N5 O5 S Cl | 388.1415 | -0.2952 | -0.7607 | 1.5 |
| 2 | C20 H23 N3 O3 Cl | 388.1422 | -0.946 | -2.4372 | 10.5 |
| 3 | C13 H31 N5 S3 Cl | 388.1424 | -1.1658 | -3.0036 | 0.5 |
| 4 | C13 H23 N9 O S Cl | 388.1429 | -1.6325 | -4.2061 | 6.5 |
| 5 | C16 H19 N9 O Cl | 388.1395 | 1.7393 | 4.4812 | 11.5 |
| 6 | C16 H27 N5 S2 Cl | 388.139 | 2.2061 | 5.6838 | 5.5 |
| 7 | C15 H23 N5 O5 Cl | 388.1382 | 3.0766 | 7.9267 | 6.5 |
| 8 | C15 H31 N O4 S2 Cl | 388.1377 | 3.5434 | 9.1292 | 0.5 |
| 9 | C9 H23 N9 O6 Cl | 388.1454 | -4.1339 | -10.6506 | 2.5 |
| 10 | C17 H27 N3 O3 S Cl | 388.1456 | -4.3179 | -11.1247 | 5.5 |
| 11 | C14 H27 N O9 Cl | 388.1368 | 4.414 | 11.3721 | 1.5 |
| 12 | C25 H23 N O Cl | 388.1462 | -4.9687 | -12.8012 | 14.5 |
| 13 | C10 H27 N9 O S2 Cl | 388.1463 | -5.0045 | -12.8935 | 1.5 |
| 14 | C19 H23 N5 S Cl | 388.1357 | 5.578 | 14.3712 | 10.5 |
| 15 | C11 H27 N7 O2 S2 Cl | 388.135 | 6.2288 | 16.0478 | 1.5 |
| 16 | C13 H27 N3 O8 Cl | 388.1481 | -6.8193 | -17.5692 | 1.5 |
| 17 | C18 H27 N O4 S Cl | 388.1343 | 6.9154 | 17.8166 | 5.5 |
| 18 | C10 H23 N7 O7 Cl | 388.1342 | 7.0993 | 18.2907 | 2.5 |
| 19 | C14 H31 N3 O3 S2 Cl | 388.1489 | -7.6999 | -19.8121 | 0.5 |
| 20 | C14 H23 N7 O4 Cl | 388.1494 | -8.1566 | -21.0147 | 6.5 |
| 21 | C22 H27 N O S Cl | 388.1496 | -8.3406 | -21.4887 | 9.5 |
| 22 | C22 H19 N5 Cl | 388.1323 | 8.95 | 23.0587 | 15.5 |
| 23 | C14 H23 N7 O2 S Cl | 388.1316 | 9.6007 | 24.7352 | 6.5 |
| 24 | C14 H31 N3 O S3 Cl | 388.1312 | 10.0674 | 25.9378 | 0.5 |
| 25 | C21 H23 N O4 Cl | 388.131 | 10.2873 | 26.5041 | 10.5 |
| 26 | C18 H27 N O6 Cl | 388.1521 | -10.842 | -27.9332 | 5.5 |
| 27 | C13 H27 N3 O6 S Cl | 388.1303 | 10.9381 | 28.1806 | 1.5 |
| 28 | C11 H27 N7 O4 S Cl | 388.1528 | -11.5286 | -29.7021 | 1.5 |

DETERMINATION OF CHEMICAL EMPIRICAL FORMULAS OF UNKNOWN COMPOUNDS USING ACCURATE ION MASS MEASUREMENT OF ALL ISOTOPES

RELATED APPLICATIONS

This application is a divisional application of U.S. patent application Ser. No. 11/267,721, filed Nov. 4, 2005, now U.S. Pat. No. 7,462,818 which is incorporated herein by reference in its entirety.

FIELD OF THE INVENTION

The present invention relates to chemical analysis using mass spectrometry systems, and more particularly, but without limitation, relates to a method for determination of the empirical formulas of unknown compounds using accurate ion mass measurement of all isotopes.

BACKGROUND INFORMATION

Mass spectrometers can be used to provide information about unknown sample compounds referred to as analytes. The mass-to-charge ratio information derived from spectrometry study, usually in the form of a mass spectrum, is used to positively determine the empirical chemical formulas of the analytes under investigation using analytical software (calculators). In the past, this determination has typically involved mathematical calculation of exact masses of all possible combinations of chemical elements. In view of the fact that large molecules can comprise an almost infinite number of possible combinations of elements, conventional calculators often allow the user to input constraints on certain parameters to limit the number of potential candidates for the empirical formula.

For example, the elements used, the minimum and/or maximum number of each element, whether the mass being searched is an odd/even or neutral species (for neutral loss from a fragmentation), possible adducts such as the molecule plus a proton, the molecule plus a potassium or sodium (all positive ions), the molecule minus a proton or the molecule plus an acetate or formate ion (all negative ions) can all be specified as constraints. Conventional calculators may also allow the user to specify a confidence limit or tolerance for the calculation.

In addition, some calculators provide functionality for determining relative abundances of isotopes present in a spectrum. The relative abundances are calculated from the known natural abundance of each isotope of each element in the empirical formula and the number of those elements. The relative ratios can then be compared to the measured ratios to test for correspondence.

However, to date, even when all the functionality of calculation software is employed and all reasonable constraints specified, too many potential candidates for the analyte ion are output by the software. A technique is needed that readily narrows down the number of potential candidates using information available from the mass spectrum and provides also provides a means to confirm otherwise error-prone results.

SUMMARY OF THE INVENTION

The present invention provides a method of determining an empirical formula of an analyte ion from a measured mass spectrum including a main peak and one or more isotope peaks. The method comprises comparing a relative isotopic intensity of the measured isotope peak to a calculated relative isotopic intensity of an isotopic ion of a proposed empirical formula and comparing a relative mass defect of the measured isotope peak to a calculated relative mass defect of the isotopic ion of the proposed empirical formula. The proposed empirical formula is identified as a potential candidate for the analyte ion based on these comparisons.

According to the present invention the mass spectrum may include additional peaks beyond the A+1 peak including one or more of an A+2, A+3, A+4 and A+5 peak. Relative mass defects for each of these additional peaks with respect to the main peak and with respect to each other can be measured and calculated. This additional relative mass defect information is useful in a variety of contexts to facilitate the identification of the analyte ion or to confirm the presence of an interfering ion.

BRIEF DESCRIPTION OF THE TABLES AND FIGURES

TABLE 1 lists common isotopes with their natural relative abundance.

TABLE 2 lists accurate masses and relative mass defects for the major isotopes of hydrogen, carbon, nitrogen, oxygen, sulfur, chlorine and bromine.

TABLE 3 shows an example output of a calculation of the relative mass defects of the A+1 and A+2 isotopes of a propazine ion according to the present invention.

FIG. 6 shows another view of an example graphical user interface of an analytical software tool in this case showing the effects of an interfering ion on the proposed empirical formula.

DETAILED DESCRIPTION

A. Definitions

It is initially noted that reference to a singular item for any of the terms used or defined herein includes the possibility that there are plural of the same items present. More specifically, as used herein and in the appended claims, the singular forms "a", "an", "said" and "the" include plural referents unless the context clearly dictates otherwise.

The following definitions of technical terms apply throughout the description herein unless the context clearly indicates otherwise.

"A" Peak—the monoisotopic (main) peak of an analyte ion shown on a mass spectrum. The monoisotopic peak for the analyte ion includes the most abundant isotopes of its constituent elements.

A+n isotope—The isotope having the number of neutrons of the monoisotope (A) of an element plus n neutrons (n can also be negative number). For example, for the element carbon, carbon-12 ($^{12}C$) is the monoisotope, carbon-13 ($^{13}C$) having one additional neutron is the A+1 isotope, and carbon-14 ($^{14}C$) having two additional neutrons is the A+2 isotope of carbon.

A+n peak—The mass spectrum an analyte ion may include an A peak and one or more isotopic peaks. Each isotopic peak will be associated with a designation 'A+n' peak, each of which is approximately n atomic mass units greater than the A peak. The 'A+n' peak should be distinguished to the 'A+n' isotope. The reason for this is best illustrated using the following example. A mass spectrum of an analyte ion containing both carbon and chlorine may show an A+2 peak. This peak may represent mass measurements for analyte ions including a single chlorine-37 ($^{37}Cl$) atom which is an A+2 isotope, and/or it may also indicate measurements for analyte ions containing two carbon-13 ($^{13}C$) atoms. Since $^{13}C$ is an A+1 isotope, this illustrates why the A+2 peak does not necessarily represent measurements of only A+2 isotopes.

Mass Defect—the difference between the mass of an atom and the sum of the masses of its constituent parts (protons, neutrons, electrons).

Relative Mass Defect—the mass defect of an isotope relative to its most abundant isotope. The relative mass defect for major isotopes of atoms commonly found in organic molecules is calculated and is shown in Table 2.

Nominal Mass (of an atom)—the number of protons and neutrons in the nucleus of an atom.

Nominal Mass Defect—the difference between the nominal and the accurate mass of an element.

B. Information in a Mass Spectrum

Figure 1:
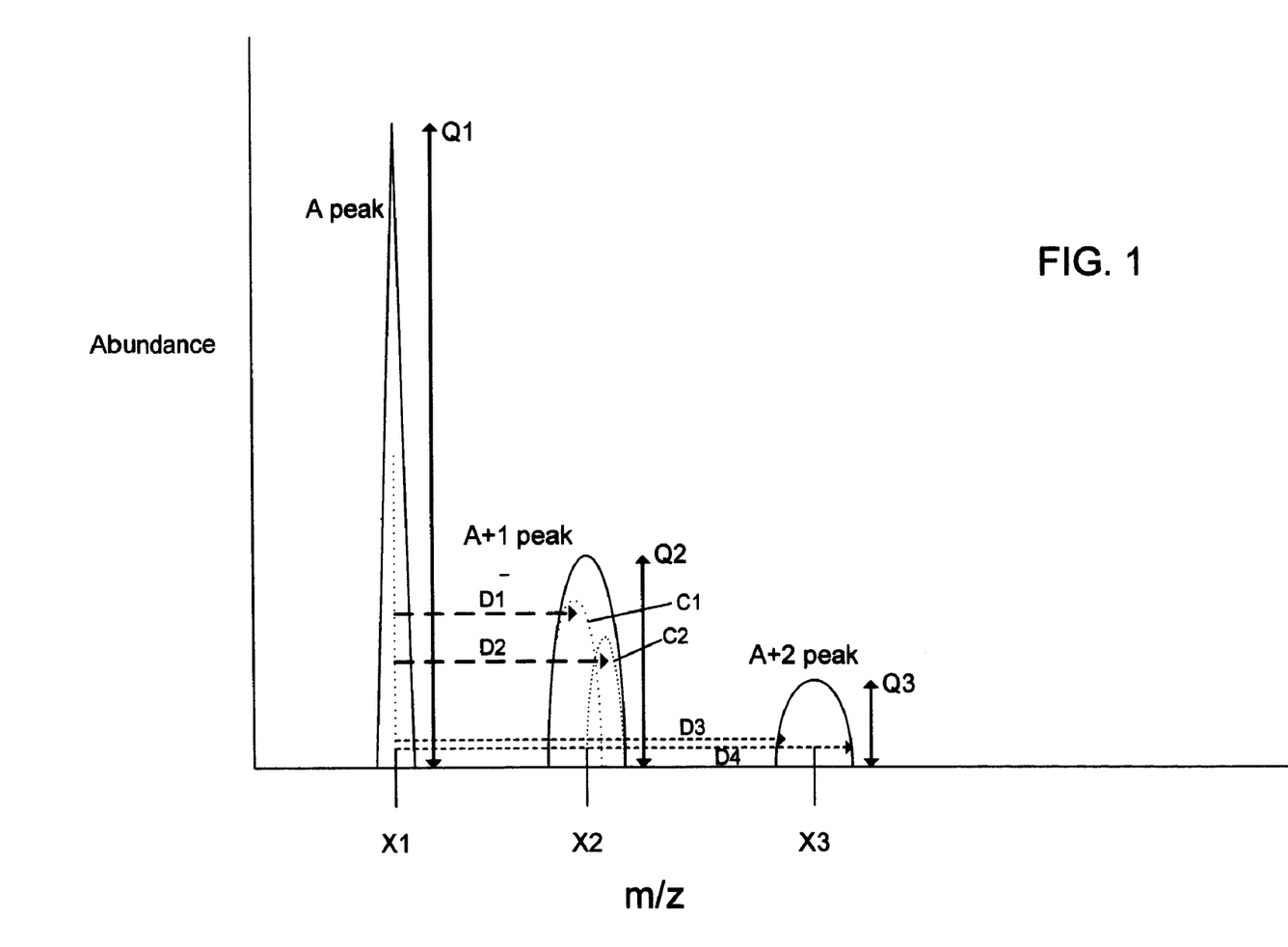
FIG. 1 is a schematic illustration of an example mass spectrum of an analyte ion.

The mass spectrum of an analyte ion is usually examined for the purposes of determining the empirical formula of the analyte. However, the data provided by the mass spectrum is not always sufficient to make this determination with certainty. It is therefore important to derive as much useful information as possible from the obtained data. FIG. 1 schematically illustrates an example mass spectrum of an analyte ion. As can be discerned, the mass spectrum includes an A peak centered at mass value X1 (strictly speaking the x axis in a mass spectrum includes m/z ratios, but the term 'mass' will be used as a shorthand to refer to these values herein), an A+1 isotope peak centered at mass value X2, and a A+2 isotope peak centered at mass value X3. The three data points X1, X2 and X3 constitute what will be referred to herein as the 'first' level of information about the analyte under investigation. It is noted that mass values discussed herein are in atomic mass units (u) unless the context clearly indicates otherwise.

In addition, each peak A, A+1, A+2 is associated with an abundance or quantity Q1, Q2 and Q3 respectively. As shown, the monoisotopic peak has a considerably higher abundance than the A+1 and A+2 isotopic peaks, which is a typical result. The absolute abundance values Q1, Q2 and Q3 do not contain significant information in themselves since they depend upon the size of the input analyte sample. However, the relative abundances, i.e., the ratios, of the abundances Q2/Q1, Q3/Q1 (and also Q3/Q2) do provide useful information, because the relative abundances of isotopic species sheds light on the elemental constituents of the analyte ion and the number of atoms of each of those constituent elements in the analyte since the isotopes of some elements are more common than others. This provides the 'second' level of information. Table 1 lists the natural abundance of stable isotopes of common elements. As indicated in Table 1, the natural abundance of $^{13}C$ (1.07%), for example, is fairly high in comparison to the natural abundance of $^{2}H$ (0.01%). Due to the high natural abundance of $^{13}C$, a high abundance ratio of the A+1 peak to the A peak (Q2/Q1) may be an indication that the analyte contains a number of carbon atoms, for example.

While the relative abundance information derivable from the isotopic peaks is useful, each of the isotopic peaks can include an overlap of isotopes of the different elements present. The resolving power of typical LC/TOF-MS instruments of approximately 10,000 is usually insufficient to separate the various A+n isotopes which usually vary by 3-6 mmu (thousandths of an atomic mass unit). To separate isotopes at a 50% valley requires resolving power about 10 times greater than what is currently available. This overlap of a plurality of different isotopic combinations is illustrated in FIG. 1 by the relatively wider spread (and lower resolution) of the A+1 and A+2 peaks in comparison with the A peak. This spread makes it more difficult to determine precise values for X2 and X3 since the accurate mass of the isotopic peaks will vary depending on the intensity and abundance of the various isotopes clustered in each peak.

The present invention therefore makes use of a third level of information which can be derived from the mass spectrum data. Once a formula is calculated as to the identity of the analyte ion from the first two levels of information, its common isotopes can be determined. In other words, the combination of isotopes that overlap to produce peaks A+1 and A+2 can be proposed by the calculating sotfware. These isotopes are illustrated by the dashed peak curves C1 and C2, corresponding to two isotopes which it is assumed account for the A+1 peak isotope cluster. It is noted however that the A+1 peak may include a greater or lesser number of isotopes and the number of isotopes shown is merely for illustrative purposes. The identity of the posited isotopes illustrated in curves C1, C2 includes useful information in terms of the differences between their exact masses and the measured mass of the A peak, which is equivalent to relative mass defect data. These differences are illustrated with broken lines D1 and D2. Similar differences D3, D4 are illustrated for the A+2 peak (corresponding curves not being shown).

It is this third level of information, relative mass defect data, that provides great confidence in the determination of the elements present and the empirical formula of the ion, whether a molecular ion, quasi-molecular ion or fragment ion, in fact much greater than the determination of the A ion and its relative abundances of the A+1, A+2 etc. In addition, if an interfering ion is present, measurement and comparison of the theoretical mass based and the measured mass will reveal that an interference is present because of the widely varying masses of the isotope cluster.

C. Calculation of the Mass of Overlapping Isotopes and Relative Mass Defects

Figure 2:
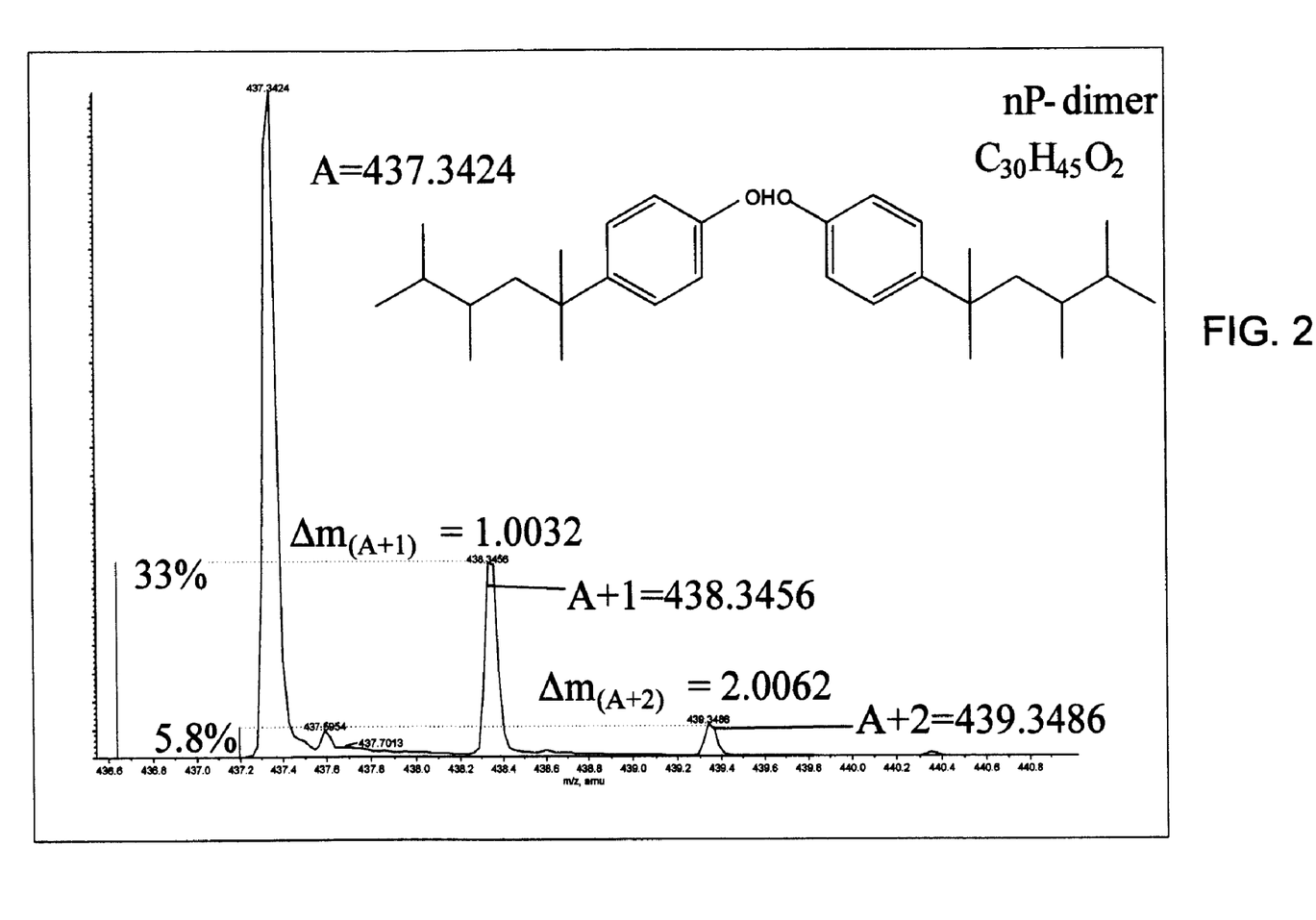
FIG. 2 shows an example mass spectrum of a dimer of nonylphenol.

FIG. 2 shows an example mass spectrum, in this case of a dimer of nonylphenol (negative ion) having the empirical formula $C_{30}H_{45}O_2$. Referring to Table 2, which shows the natural abundance of common stable isotopes, it can be seen that the main isotopes of significance in this formula are $^{13}C$, having a natural abundance of 1.07% and $^{18}O$ which has a natural abundance of 0.205%. FIG. 2 shows an A peak at 437.3424, an A+1 peak at 438.3456 and an A+2 peak at 439.3486. Because there are 30 carbon atoms in the molecule, and any one of them can be a $^{13}C$ atom, the A+1 peak is approximately 32% of the A peak in abundance (30×1.078=32.3%). From the listing in Table 1, the accurate mass of $^{13}C$ is 13.00335. The main component of the difference in mass between the A+1 peak and the A peak comes from the replacement of one atom of $^{12}C$ with one atom of $^{13}C$. The mass difference $\Delta m_{(A+1)13C}$ is:

$$^{13}C - ^{12}C = \Delta m_{(A+1)13C}$$

$$13.00335 - 12.000 = \Delta m_{(A+1)13C}$$

$$1.0034 = \Delta m_{(A+1)13C}$$

The difference between the A+1 and A peak masses (438.3456−437.3424=1.0032) matches this difference closely. In addition, there is a small contribution to the A+1 peak from $^{2}H$ and $^{17}O$ of 0.58% and 0.076% of the approximately 33% total. According to the present invention, the percentage contribution from each of the elements to the accurate mass of the A+1 peak is calculated as follows:

$$P13C = 32.3/(32.3+0.076+0.58) = 98.0\%$$

The total contributions of $^{2}H$ and $^{17}O$ are made by similar calculation. A total mass difference $\Delta m_{(A+1)}$ can then be determined which is a sum, over all relevant isotopes, of their percentage contribution times their relative mass difference from the A peak, in this case:

$$\Delta m_{(A+1)} = \Sigma (P_{13C}\Delta m_{13C} + P_{2H}\Delta m_{2H} + P_{17O}\Delta m_{17O})$$

Similar calculations are performed for the A+2 peak and any further peaks A+3, A+4, etc. present. The relative abundance of the A+2 peak is 5.8%, most of which arises from the fact that there is a 5.4% probability that 2 of the 30 carbon atoms in the dimer with be $^{13}C$. The contribution from $^{18}O$ is small because of the low number of oxygen atoms in the dimer. The sum calculation of mass difference $\Delta m_{(A+2)}$ comes to 2.0066 which comes close to the experimental value of 2.0062 shown in the mass spectrum of FIG. 2.

Figure 3:
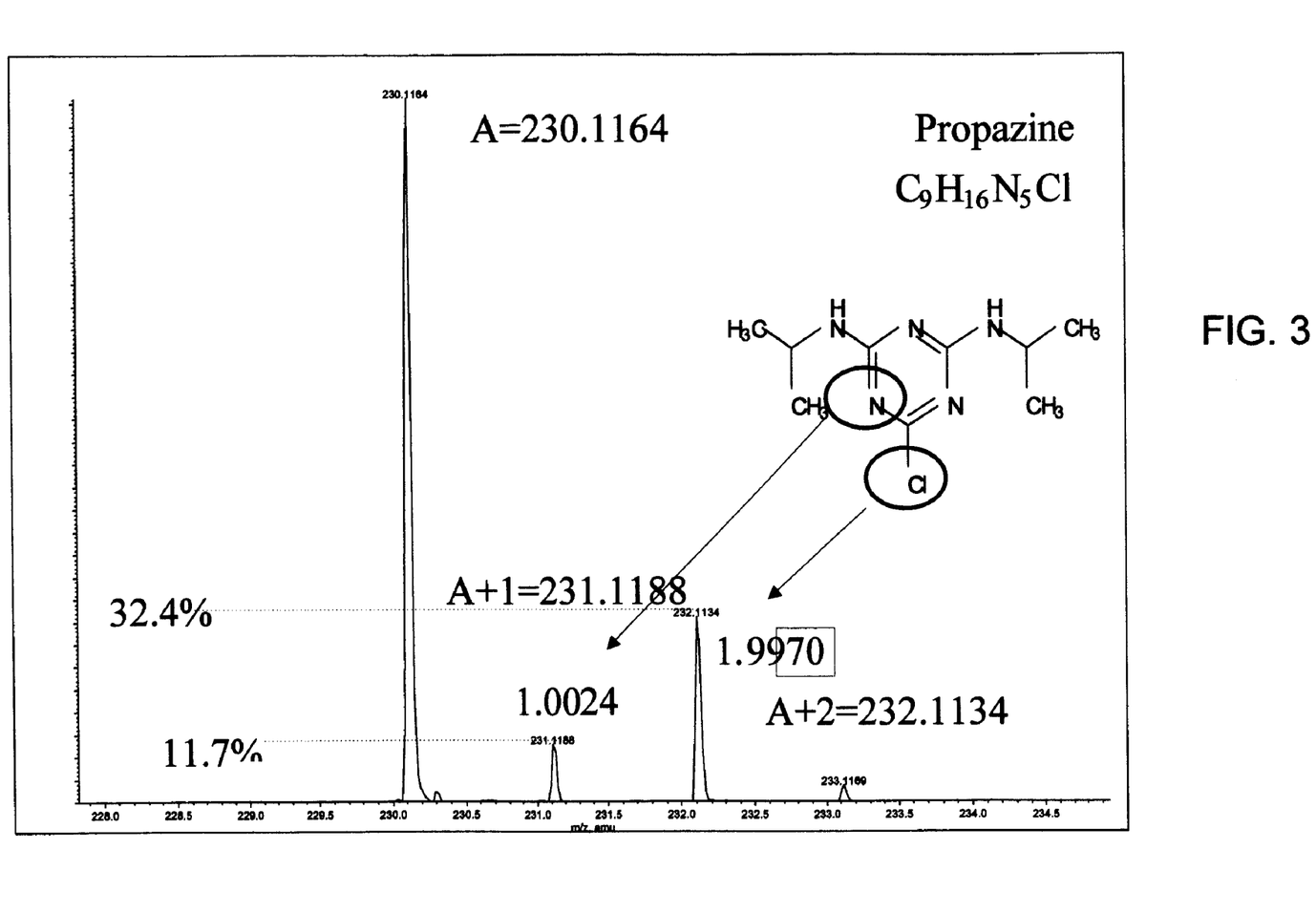
FIG. 3 shows an exemplary mass spectrum of propazine.

The mass differences $\Delta m_{(A+1)}$ and $\Delta m_{(A+2)}$ are valuable tools because they can be used as a means to positively determine the correct empirical formula. The $\Delta m_{(A+2)}$ value can be a particularly useful check when the analyte ion contains halogen atoms. For example, FIG. 3 shows an exemplary mass spectrum for propazine which contains five nitrogen atoms and a single chlorine atom. The spectrum shows an A peak at 230.1164, an A+1 peak at 231.1188 and an A+2 peak at 232.1134. The relative abundance of the A+1 peak, at 11.7% of the A peak, is due to $^{13}C$ (at 1.07%) and $^{15}N$ (at 0.368%). Since $^{15}N - ^{14}N$ is 0.997 u , the relative mass defect of $^{15}N$ slightly depletes the $\Delta m_{(A+1)}$ peak, with the result that the $\Delta m_{(A+1)}$ of propazine comes to 1.0024 u, which exactly matches the experimental difference (i.e., 231.1188−230.1164). With regard to the A+2 peak, its relative mass defect is due mainly to chlorine ($^{37}Cl$) which has a relative abundance of 24.22%. In this case the calculated $\Delta m_{(A+2)}$ comes to 1.9971 u which closely matches the observed mass difference of 1.997 u (=232.1134−230.1164). It can therefore be seen that the comparison of the calculated mass difference information of the isotopes of the empirical formula of propazine against the experimental values in the mass spectrum provides an excellent confirmation that the correct empirical formula is being employed and that the analyte is, in fact, propazine.

In addition to using the mass difference $\Delta m$ in calculations, the relative mass defect $R\Delta m$ may be employed instead as a simplification. Since the A+1 peak is approximately one mass unit great than the A peak, and the A+2 peak two units greater, the nominal mass increase of 1 unit for the A+1 peak, and 2 for the A+2 peak (and n for any higher n peaks) can be subtracted. For example, $$R\Delta m_{(A+1)} = \Delta m_{(A+1)} - 1$$

and $$R\Delta m_{(A+2)} = \Delta m_{(A+2)} - 2$$

Applying these formulae to propazine, $R\Delta m_{(A+1)}$ is equal to 1.0024 u−1 or 0.0024 u. Likewise, $R\Delta m_{(A+2)}$ is equal to 1.9971 u−2 or −0.0029 u. Table 3 is an example listing of the composition of propazine including a calculation of the relative mass defects for the A+1 and A+2 peaks according to the present invention. As indicated, each element is listed together with the number of atoms and the total mass of the respective element in propazine.

D. Determining and/or Confirming an Empirical Formula

Figure 4:
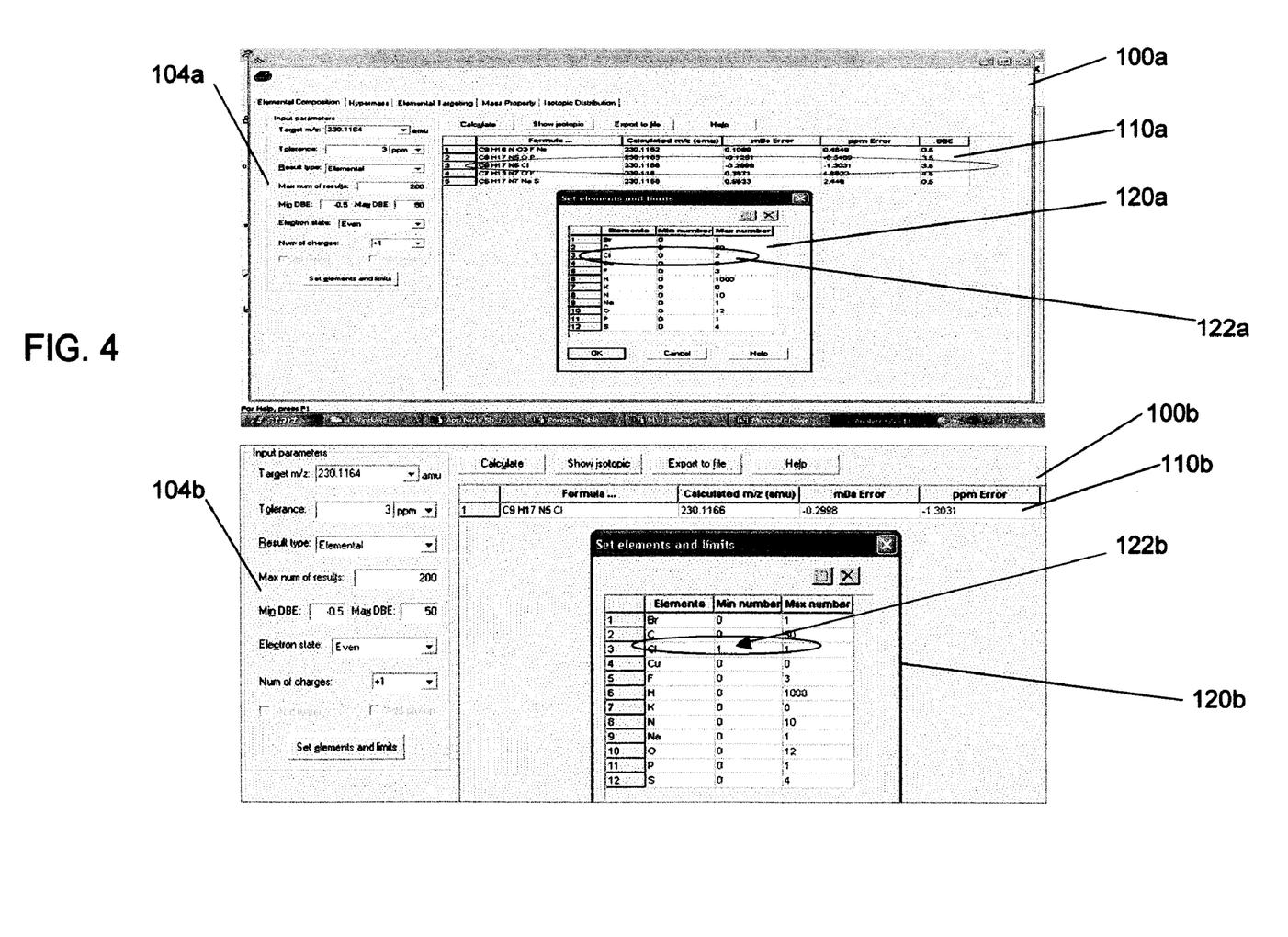
FIG. 4 shows an example graphical user interface of an analytical software tool used for determining the empirical formula of analyte ions according to the present invention.

The total mass difference and relative mass defect information can be used to narrow the candidates for the empirical formula of the analyte. FIG. 4 shows an example graphical user interface of an analytical software tool used for determining the empirical formula of analyte ions. It is noted that the present invention may be advantageously used in conjunction with such a software tool, and with other types of analytical tools as known in the art. In FIG. 4, there are two analytical screens 100a, 100b, each of which presents a respective list 110a, 110b of proposed empirical formulae for the analyte ion. The proposed candidates are constraints firstly by input parameters entered and shown at 104a, 104b, and also subject to limitations entered into listings of possible elements 120a, 120b. As can be discerned, in the element listing 120a in analytical screen 100a, the minimum number of chlorine atoms permitted is set to zero and the maximum number is set to two at item 122a. At the set level of accuracy of 3 ppm, the listing 110a shows five possible candidates for the analyte ion using all the levels of information obtained from the mass spectrum. In the corresponding element listing 120b in screen 100b, the permissible number of chlorine atoms is set at 1 at item 122b, and the listing of proposed potential candidates is reduced to a single candidate ion.

Figure 5:
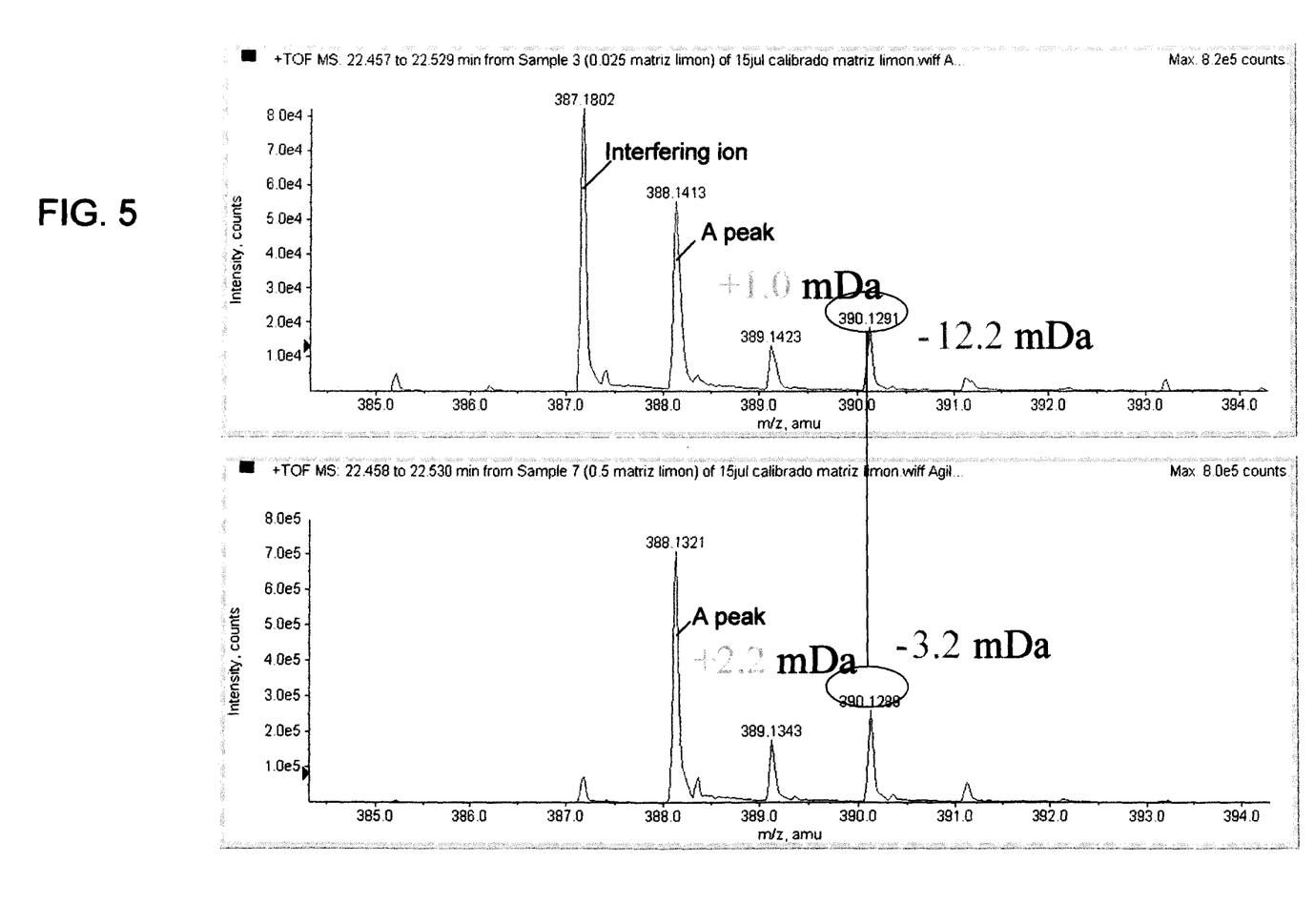
FIG. 5 shows another example mass spectrum which illustrates how an interfering ion can be detected according to the present invention.

FIG. 5 shows another example mass spectrum which illustrates how an interfering ion can be detected according to the present invention. The upper spectrum in FIG. 5 shows a mass spectrum of the pesticide dimethomorph but also includes an interfering ion at an m/z value of 387.1802. The calculated accurate mass of dimethomorph is 383.131. The measured m/z value of the second peak (the A peak of the dimethomorph) in the upper spectrum is 388.1413. This matches fairly closely with the calculated accurate mass, so from this information alone, it would be difficult to establish the presence of the interfering ion. However, the relative mass defect values in the upper spectrum are 1.0 and −12.2 for the A+1 and A+2 peaks. Using an analytical software tool as shown in FIG. 6, it is found that these relative mass defect values do not correlate with dimethomorph or with any other proposed empirical formula. In fact, dimethomorph is listed as the 25$^{th}$ choice (circled) with an error of 26 ppm. From this information it is established that an interfering ion is present, and it also concluded that the interfering ion includes a $^{13}C$ isotope that has a mass very close to the dimethomorph ion.

The bottom spectrum includes a higher concentration of dimethomorph analyte and therefore the interfering ion does not affect the measurements. The m/z value of the A peak is 388.1321, and the observed values for the relative mass defects, 2.2 and −3.2 match more closely with the calculated values of 3.3 and −2.5, respectively. In the corresponding empirical formula listing (not shown), dimethomorph moves to the 4$^{th}$ choice, with an error of 2.8 ppm.

Thus, the use of the accurate mass for the A+1 and A+2 isotopic clusters proves a very useful procedure for checking the empirical formula for interferences, to confirm its accuracy, and as a further source of information for selecting numbers of atoms in an elemental calculator to assist in determining the correct empirical formula to match mass spectrum data.

While the description above has mainly discussed using information gathered from the A+1 and A+2 isotopic clusters, it is noted that relative mass defect values can be gathered from higher-numbered peaks from A+3, A+4 and beyond. For example, combinations to consider for the A+3 peak, where the A peak contained Cl, C, N, and H would be $^{37}$Cl—$^{13}$C, $^{37}$Cl—$^{2}$H, $^{37}$Cl—$^{15}$N, $^{13}$C—$^{13}$C—$^{13}$C, $^{13}$C—$^{13}$C—$^{15}$N, $^{13}$C—$^{13}$C—$^{2}$H, $^{13}$C—$^{15}$N—$^{15}$N, $^{13}$C—$^{2}$H—$^{2}$H, $^{13}$C—$^{15}$N—$^{2}$H, $^{15}$N—$^{15}$N—$^{15}$N, $^{15}$N—$^{15}$N—$^{2}$H, $^{15}$N—$^{2}$H—$^{2}$H, and $^{2}$H—$^{2}$H—$^{2}$H. Each of these combinations is weighted by the number of atoms in the molecule, the percent natural abundance, and the probability of their occurrence, which is then factored against the relative mass defect of the sum of the isotopes of each combination. For the A+4 peak it would be $^{37}$Cl—$^{37}$Cl, $^{37}$Cl—$^{13}$C—$^{13}$C, $^{37}$Cl—$^{13}$C—$^{15}$N, etc. for all combinations of the isotopes that equal A+4. It is important to realize that this calculation may be affected by rounding errors of the accurate masses. Thus, it is important that only the atoms involved in the mass defect be included in this calculation. Finally, in general it is important to consider out to A+5 for most small molecules (less than 500 molecular weight) that contain two halogens or more.

Furthermore, it is also possible to calculate secondary relative mass defects, which are defects taken between isotopic peaks rather than relative to the main A peak. For example, the defects as measured between the A+2–A+1, A+3–A+1, A+3–A+2, etc. also include useful information. In this case, it is understood the measurements are being made to measured m/z values of isotopic clusters.

Having described the present invention with regard to specific embodiments, it is to be understood that the description is not meant to be limiting since further modifications and variations may be apparent or may suggest themselves to those skilled in the art. It is intended that the present invention cover all such modifications and variations as fall within the scope of the appended claims.

What is claimed is:

1. An apparatus for of determining an empirical formula of an analyte ion from a mass spectrum that includes a main peak and one or more isotope peak, the system comprising: a processor; and
   a memory unit coupled to the processor, the memory unit including stored instructions for causing the processor to:
   a) obtain mass spectrum data;
   b) determine a relative mass defect of the isotope peak of the mass spectrum relative to the main peak and further isotope peaks;
   c) calculate a relative mass defect of a corresponding isotopic ion of a proposed empirical formula;
   d) compare the relative mass defect of the isotope peak of the mass spectrum and the relative mass defect of the isotopic ion of the proposed empirical formula; and
   e) identify the proposed empirical formula as a potential candidate for the analyte ion based on the comparison.

2. The apparatus of claim 1, further comprising:
   a data interface connectable to a mass spectrometer system to obtain the mass spectrum data from a mass spectrometer system.

3. The apparatus of claim 1, wherein the isotope peak of the mass spectrum includes an A+1 peak and at least one additional isotope peak.

4. The apparatus of claim 1, wherein the memory unit includes instructions for causing the processor to:
   compare the relative mass defect of the at least one additional isotope peak of the mass spectrum to a calculated relative mass defect of the corresponding isotopic ion of the proposed empirical formula.

5. The apparatus of claim 1, wherein the isotope peak of the mass spectrum includes an A+1, A+2, A+3, A+4 and A+5 peak.

6. The apparatus of claim 1, wherein the memory unit includes instructions for causing the processor to:
   calculate a difference between the relative mass defect of the isotope peak of the mass spectrum and the relative mass defect of the corresponding isotopic ion of the proposed empirical formula; and
   determine whether the difference is below a threshold value.

7. A system for of determining an empirical formula of an analyte ion from a mass spectrum that includes a main peak and an isotope peak, the system comprising:
   a mass spectrometer; and
   a data acquisition and analysis unit comprising:
      a processor;
      a memory unit coupled to the processor, the memory unit including stored instructions for causing the processor to:
      a) obtain mass spectrum data;
      b) determine a mass defect of the isotope peak of the mass spectrum relative to the mass of the main peak;
      c) propose an empirical formula for the analyte ion;
      d) calculate a relative mass defect of a corresponding isotopic ion of the proposed empirical formula;
      e) compare the relative mass defect of the isotope peak of the mass spectrum and the relative mass defect of the isotopic ion of the proposed empirical formula; and
      f) identify the proposed molecular composition as a potential candidate for the analyte ion based on the comparison; and
   a data interface coupling the mass spectrometer to the processor.

8. The system of claim 7, wherein the isotope peak of the mass spectrum includes an A+1 peak and at least one additional isotope peak.

9. The system of claim 8, wherein the memory unit includes instructions for causing the processor to:
   determine a mass defect of the at least one additional isotope peak of the mass spectrum relative to the mass of the main peak and relative to one another; and
   compare the relative mass defect of the additional at least one isotope peak of the mass spectrum to a calculated relative mass of defect of a corresponding additional isotopic ion of the proposed empirical formula.

10. The system of claim 7, wherein the isotope peak of the mass spectrum includes at least one of an A+2, A+3, A+4 and A+5 peak.

11. The system of claim 7, wherein the memory unit includes instructions for causing the processor to:
   calculate a difference between the relative mass defect of the isotope peak of the mass spectrum and the relative mass defect of the corresponding isotopic ion of the proposed empirical formula; and
   determine whether the difference is below a threshold value.

* * * * *

UNITED STATES PATENT AND TRADEMARK OFFICE
CERTIFICATE OF CORRECTION

PATENT NO. : 7,855,356 B2  
APPLICATION NO. : 12/324351  
DATED : December 21, 2010  
INVENTOR(S) : Jerry A. Zweigenbaum et al.

It is certified that error appears in the above-identified patent and that said Letters Patent is hereby corrected as shown below:

On the Title page, in Item (75), in "Inventors", in column 1, line 2, delete "Almerta" and insert --Almeria --, therefor.

On the Title page, in Item (75), in "Inventors", in column 1, line 5, delete "Almerla" and insert -- Almeria --, therefor.

Signed and Sealed this  
Third Day of May, 2011

David J. Kappos  
*Director of the United States Patent and Trademark Office*